(12) United States Patent
Klein et al.

(10) Patent No.: US 7,926,026 B2
(45) Date of Patent: Apr. 12, 2011

(54) GRAPHICAL ANALYSIS TO DETECT PROCESS OBJECT ANOMALIES

(75) Inventors: Udo Klein, Maximiliansau (DE); Thomas Wieczorek, Meckesheim (DE); Daniel Zimmermann, Leimen (DE); Oliver Sievi, Sandhausen (DE); Guenter Pecht-Seibert, Muehlhausen (DE)

(73) Assignee: SAP AG, Walldorf (DE)

( * ) Notice: Subject to any disclaimer, the term of this patent is extended or adjusted under 35 U.S.C. 154(b) by 1147 days.

(21) Appl. No.: 11/613,413

(22) Filed: Dec. 20, 2006

(65) Prior Publication Data

US 2008/0155335 A1 Jun. 26, 2008

(51) Int. Cl.
*G06F 9/44* (2006.01)
(52) U.S. Cl. .................................. 717/105; 707/737
(58) Field of Classification Search ................... 717/104, 717/105, 120–123
See application file for complete search history.

(56) References Cited

U.S. PATENT DOCUMENTS

| | | | |
|---|---|---|---|
| 5,317,741 A * | 5/1994 | Schwanke | 717/120 |
| 5,485,621 A * | 1/1996 | Schwanke | 717/121 |
| 6,003,040 A * | 12/1999 | Mital et al. | 717/165 |
| 6,119,124 A * | 9/2000 | Broder et al. | 1/1 |
| 6,349,296 B1 * | 2/2002 | Broder et al. | 1/1 |
| 6,581,058 B1 * | 6/2003 | Fayyad et al. | 707/737 |
| 6,658,423 B1 * | 12/2003 | Pugh et al. | 1/1 |
| 7,047,497 B2 * | 5/2006 | Patrizio et al. | 715/760 |
| 7,243,100 B2 * | 7/2007 | Ma et al. | 1/1 |
| 7,690,037 B1 * | 3/2010 | Hartmann | 726/23 |
| 2002/0103793 A1 * | 8/2002 | Koller et al. | 707/3 |
| 2003/0167455 A1 * | 9/2003 | Iborra et al. | 717/105 |
| 2004/0003005 A1 * | 1/2004 | Chaudhuri et al. | 707/200 |
| 2004/0148586 A1 * | 7/2004 | Gilboa | 717/108 |
| 2005/0234972 A1 * | 10/2005 | Zeng et al. | 707/103 R |
| 2006/0047617 A1 * | 3/2006 | Bacioiu et al. | 706/59 |
| 2006/0206865 A1 * | 9/2006 | Reinhardt et al. | 717/108 |
| 2007/0171716 A1 * | 7/2007 | Wright et al. | 365/185.12 |
| 2008/0109730 A1 * | 5/2008 | Coffman et al. | 715/733 |
| 2008/0209391 A1 * | 8/2008 | Iborra et al. | 717/105 |

OTHER PUBLICATIONS

An approach for object-oriented cluster-level tests based on UML Huo Yan Chen.Systems, Man and Cybernetics, 2003. IEEE International Conference on (1062-922X) (0-7803-7952-7) 2003.vol. 2;p. 1068 vol. 2-1068 vol. 2 Source: IEEE Electronic Library Online http://ieeexplore.ieee.org/search/advsearch.jsp) Link to content: http://ieeexplore.ieee.org/stamp/.*
S. Mancoridis, et al., "Using Automatic Clustering to Produce High-Level System Organizations of Source Code", Program Comprehension, 1998. IWPC '98 Proceedings., 6th International Workshop, Jun. 24-26, 1998, pp. 45-52, Ischia, Italy.

* cited by examiner

*Primary Examiner* — Wei Y Zhen
*Assistant Examiner* — Matthew J Brophy
(74) *Attorney, Agent, or Firm* — Kenyon & Kenyon LLP

(57) ABSTRACT

A method and system for graphical analysis to detect anomalies in process objects. The method generates a graph to represent a set of process objects, applies a clustering algorithm to cluster like nodes of the graph, compares the clusters to the process objects, and, if the objects match the clusters, accepts the objects for further review or for use in applications. If one or more of the objects do not match the clusters, such suggests that there are anomalies in the process objects requiring correction. An example implementation may be to detect anomalies in the design of the process objects.

21 Claims, 7 Drawing Sheets

GRAPHICAL ANALYSIS TO DETECT PROCESS OBJECT ANOMALIES

BACKGROUND

Most computer systems include numerous application components that interact with each other, from shared data to shared modules. Therefore, when designing new components and/or revised existing components to be introduced into a system, it can be very difficult to understand the integral relationships that either already or will exist between the many components, which makes detecting design anomalies a complex task. Such detection requires analyzing the to-be-introduced components to detect any anomalies within the components themselves, analyzing the relationships between the to-be-introduced components to detect any anomalies between them, and then analyzing the relationships between the to-be-introduced components and the unrevised existing components to detect any anomalies between them.

Traditionally, developers have relied on design reviews and/or runtime behavior monitoring to detect anomalies in the design of the to-be-introduced components. However, because of the detection complexity required, these techniques may not be enough to catch all anomalies. Moreover, these techniques may be time-consuming and prohibitively expensive. In which case, developers are forced to introduce new or revised components based on incomplete design analysis. Such is inefficient and ineffective.

This problem is compounded by the introduction of increasingly complex application components. For such components, anomaly detection becomes even more difficult. Such is the case with a new entity called a process object.

A process object is a new object in a computer system that describes the structure and behavior of a business process. As such, the process object may include data, logic, and structures. The process object may include data and routines to manipulate the data, as in object-oriented objects, and structures, e.g., database tables, to describe the relationships (or associations) with other process objects, as in relational database objects. In an SAP system, these process objects are the core structuring components that encapsulate the functionalities applications need to implement business processes. Each process object advantageously provides a discrete representation of the structure and behavior of a business process. An SAP application to implement a business process may then advantageously access the appropriate process objects and their data, without having to know the details of the underlying implementation.

Unlike traditional objects, the new process object encapsulates the business process' functionality within the object itself (and, in some cases, in other entities referenced by the object), defines relationships between different components and process objects, and provides the basic building block for applications. Whereas the traditional object defines, rather than encapsulates, functionality at a high level by referring to the business modules that provided the functionality, where the business modules are the basic building blocks for applications, and does not include structural information about the object's relationships. In the SAP system, in many cases, the new process object has superseded the traditional object.

Since process objects are the core structuring components in an SAP system, the process objects should be designed to operate correctly. Because a process object describes both internal relationships between its components and external relationships with other process objects' components, introduction of new process objects and/or modification of existing process objects in a system may lead to unexpected consequences. Therefore, it is important to analyze the design of the process objects and all their relationships, prior to introduction, to avoid such consequences.

However, known object-oriented analyses of process objects to detect anomalies may not be sufficient because they focus on the object-oriented aspects of the process objects, but not the process objects' relationships. Similarly, known relational database analyses may not be sufficient because they focus on the relational database aspects of the process objects, but not the process objects' data and routines.

Accordingly, there is a need in the art for an effective and efficient way to automatically detect anomalies in the design of these process objects to be corrected.

DETAILED DESCRIPTION

Figure 1:
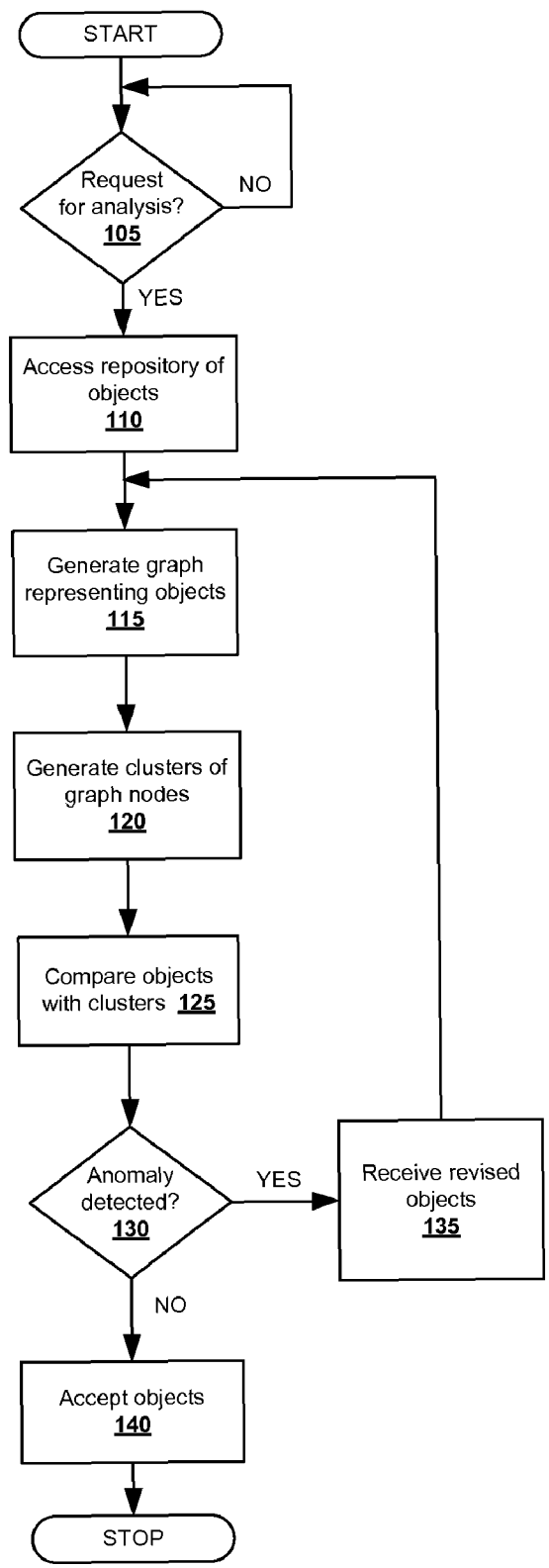
FIG. 1 is a flowchart of a graphical analysis method for detecting anomalies in process objects in accordance with an embodiment of the present invention.

Embodiments of the present invention solve the above-identified problems associated with process objects by using graphical analysis to detect anomalies in the design of process objects. Graphical analysis involves generating a graph to represent a group of elements and their relationships to each other and then analyzing the graph using any known graph analytical tool to discern information about the elements themselves, their relationships to each other, or both.

Graphs are known as mathematical structures used to model relationships between elements of a particular group, where the nodes of a graph represent the elements and the edges of the graph depict the relationships between the elements. Typically, the semantics of the elements are either subsumed into or eliminated from the graph in order to represent and analyze the elements in their relational context. Common types of graphs include the directed graph, which includes directed edges to indicate an ordered relationship between the connected elements, and the weighted graph, which includes weighted edges to indicate some label or value associated with the relationship between the connected elements. A sub-graph of a graph may include a subset of nodes and their edges.

Graph visualization tools are known for generating graphs. Such tools are generally graphically-based and interactive, in which the tool draws nodes and edges to connect the nodes, associates information about the elements with the elements' representative nodes and about the elements' relationships with the elements' representative edges, and then generates a layout of the graph in memory based on the drawing and the information. The above actions may be performed automatically by the tool, manually by the developer, or a combination of both. The developer may draw the nodes and edges using the tool's graphical interface, input element information via the tool's user interface, and input a command to generate the graph. Alternatively, the developer may create command files to be accessed by the tool to render the graph and/or data files to be read by the tool to get the information about the elements and their relationships. An example of a graph visualization tool is yED™, a Java™ graph editor. Other such tools may also be used to generate graphs.

Many tools are known for analyzing graphs. One such tool is clustering, in which the nodes in a graph that are similar in some way are grouped together to form several clusters, where the nodes in a cluster are similar to each other and dissimilar from the nodes in the other clusters. Similarity may be determined from parameters associated with the elements represented by the nodes. One of the more commonly used clustering tools is the exclusive clustering algorithm, in which the nodes of a graph are clustered in an exclusive way, i.e., a node can belong to only one cluster. An example of the exclusive clustering algorithm is the K-means algorithm, which sets K clusters, defines the centroid of each cluster, and then groups the nodes of the graph around whichever centroid most minimizes the similarity parameter of that centroid's cluster. Other clustering algorithms may also be used to cluster graphs. And other tools may be used to analyze graphs.

Graphical analysis may be well-suited to the process objects according to embodiments of the present invention, because the graphical analysis may consider both the objects and their relationships. The generated graph may represent the data and routines of the process objects by the nodes and may represent the structures that define the relationships of the process objects by the edges of the graph. Moreover, all of the process objects may be represented in one graph, thereby providing concurrent intra-object and inter-object analysis. Each process object may be represented by a sub-graph within the graph. Clustering may then be used to analyze the correctness of the process objects by comparing the resulting clusters with their corresponding process objects. If the results of the clustering coincide with the process objects, that process objects may be deemed acceptable. Whereas, if the resulting clusters exclude some nodes representing data and/or routines in the process objects or group together some nodes representing data and/or routines in different process objects, one or more of the process objects may be deemed to have anomalies requiring correction.

Embodiments of the present invention include a graphical analysis method and system to detect anomalies in process objects.

In a method according to an embodiment of the present invention, a processor may generate a graph to represent a group of process objects. The processor may then cluster like nodes of the graph. The processor may compare the process objects with the clusters to determine whether they match. If one or more of the process objects do not match any of the generated clusters, such may be indicative of anomalies in the process objects that require correction. Upon receipt of revised process objects from the developer to correct the anomalies, the processor may repeat the method until the process objects match the clusters. The process objects would then be deemed acceptable for further review or to be accessed by applications.

A system in accordance with an embodiment of the present invention may include memory and a processor to graphically analyze process objects. The processor may generate a graph of the process objects, cluster the nodes of the graph, determine whether the clustered nodes correspond to the process objects, and, based on this determination, determine whether the process objects include anomalies.

A graphical analysis tool in accordance with an embodiment of the present invention may be used by the developer to search for anomalies in process objects.

While embodiments of the present invention apply to process objects, it is to be understood that these embodiments may apply to any objects that include components and their internal and external relationships.

In addition to detecting design anomalies in new and/or revised process objects, embodiments of the present invention may be used to detect other types of anomalies in process objects.

FIG. 1 is a flowchart of a method of graphical analysis for detecting anomalies in process objects. In this method, a processor may await (105) a request for analysis from a user. Upon receipt of the request, the processor may access (110) a repository of process objects. In an SAP system, the process object repository may store the process object information so that, when a developer creates an application to access a process object, the developer need only look in the repository for the process object and the calls to that object that the application should include in order to execute a business process. At runtime, the repository may create instances of the process objects that the calling application may then access.

The processor may generate (115) a graph representing the process objects. The processor may use any graph generation tool, for example, the graph visualization tool, that has been modified to apply to process objects. The nodes of the graph represent the process objects' components. The edges of the graph represent the relationships (or associations) between the components within each process object and between the components in different process objects. A sub-graph may be generated for each process object in a tree structure, where the process object itself represents the parent node and the data and routines of the process object represent the child nodes connected via edges to represent the relationship between the data and routines. For example, if routine A calls routine B, then routine A's node will connect via edge to routine B's node to represent their relationship.

In an embodiment of the present invention, the semantics of the relationships may be ignored, such that the graph may be processed as merely a graph of nodes and edges. In an alternate embodiment, the semantics may be subsumed into the graph, for example, as weighted edges to indicate some label or value associated with the relationships or as directed edges to indicate ordered relationships.

The processor may generate (120) clusters of graph nodes using any clustering algorithm, for example, the K-means algorithm. Like nodes may be clustered together based on some clustering similarity parameters, such as distance, function, description, etc. The similarity parameters to use may be determined from parameters associated with the objects.

The processor may compare (125) the process objects with the clusters to determine whether the clusters correspond to the process objects. Data from one or more performance metrics may be calculated for the clusters and the process objects. Examples of metrics may include number of cluster nodes compared to number of process object components, number and configuration of cluster edges compared to number and configuration of relationships between process object components, etc. The calculated metrics data for the clusters and the process objects may then be statistically compared to determine how well matched the clusters and the process objects are. The comparison result could be a numerical, logical, graphical, etc., difference. A process object may be considered a match for a cluster if the comparison results are approximately the same as a predetermined value, within a predetermined range, less than or greater than a predetermined limit, etc.

Based on the comparison, the processor may determine (130) whether there are anomalies in one or more of the process objects, e.g., in the design of one or more of the process objects. Whether there is an anomaly may be determined from two tests. First, if the process object does not match a cluster, as described above, the processor may indicate that there are anomalies. Second, if the process object passes the first test, i.e., the process object does match a cluster, the processor may then determine whether the performance metrics data for the matched process object is approximately the same as that which defines a "normal" process object. Performance metrics data for a "normal" process object may be predetermined, based on quantitative, qualitative, or empirical data from objects that have worked well in the past, for example. If the difference between the performance metrics data for the matched process object and that of the "normal" process object exceeds some threshold, the processor may indicate that there are anomalies. One or more performance metrics may be used to determine whether there are anomalies. If multiple metrics are used, the processor may indicate that there are anomalies if the data from one or more of the metrics for the matched process objects indicate anomalies.

The anomaly determination may be done for all the process objects with respect to all the clusters. If no anomalies are detected, the processor may deem (140) the process objects as acceptable. The process objects may then be processed further or accepted for used in applications.

If one or more anomaly is detected (130), the processor may generate and display an error message to the user that there are anomalous process objects. The error message may indicate the most likely anomalous object and component. After the user revises one or more of the process objects to remove the anomalies, e.g., revises the design of the anomalous object and/or component, the processor may receive (135) the revised process objects from the user. The revisions may include adding new components to process objects, deleting existing components from process objects, shifting components from one process object to another, changing the relationships between existing components, etc. The processor may then generate (115) a new graph of the process objects, including the revised ones.

The processor may repeat the comparing (125), detecting (130), and revising (135) until all process objects match clusters.

Figure 2:
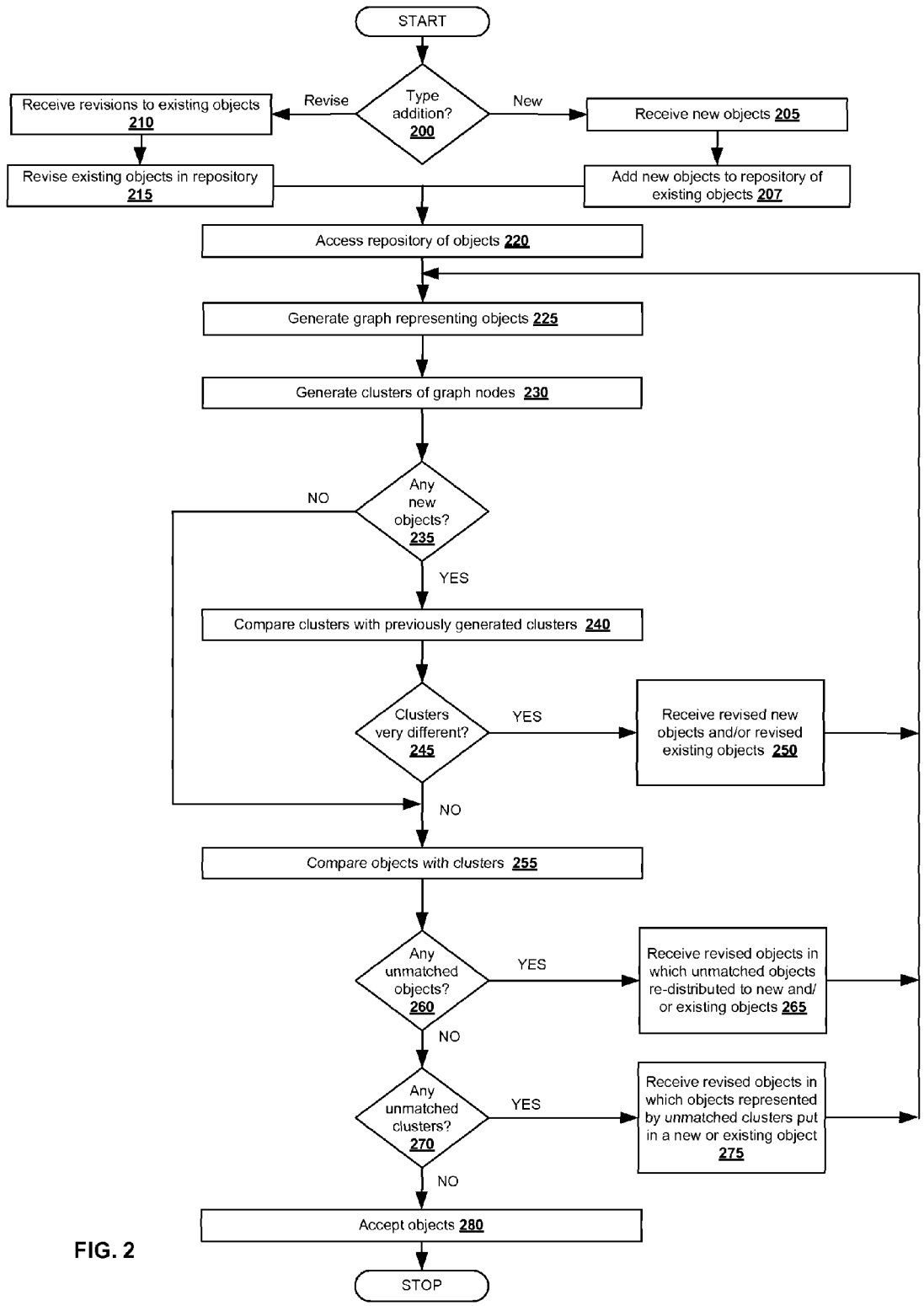
FIG. 2 is a flowchart of another graphical analysis method for detecting anomalies in process objects in accordance with an embodiment of the present invention.

FIG. 2 is a flowchart of an alternate method of graphical analysis for process objects. Upon receipt of a request for analysis, a processor may determine (200) the type of object change to be introduced into the system. If new objects are to be introduced, the processor may receive (205) the new process objects from a user or another processor. The processor may add (207) the new process objects to the repository of existing process objects. If revisions to existing objects are to be introduced, the processor may receive (210) the revisions from a user or another processor. The processor may revise (215) the appropriate existing process objects in the repository with the revisions.

The processor may access (220) the repository of process objects. The processor may then generate (225) a graph representing the process objects and apply a clustering algorithm to the graph to generate (230) clusters of like graph nodes, as described above regarding FIG. 1.

If no new process objects have been introduced into the system (235), the processor may skip the clustering analysis (240, 245, 250), described below.

For any new process objects (235), the processor may compare (240) the currently generated clusters, which include nodes representing the new process objects, with the previously generated clusters, which were generated prior to addition of the new process objects. If the current and previous clusters are very different (245), e.g., in number of cluster nodes, etc., such a difference may indicate that one or more of the new process objects are flawed or that one or more of the existing process objects are flawed, the existing flaw having been exposed by the addition of the new process objects. The clusters may be considered very different if the difference between a predetermined cluster parameter, e.g., number of nodes per cluster, for the current and the previous clusters exceeds a predefined threshold, for example.

If the clusters are very different (245), the processor may generate and display an error message to the user that the clusters are very different. The error message may indicate the most likely process objects and/or components that are causing the cluster differences. After the user revises one or more of the new and/or existing process objects, the processor may receive (250) the revised process objects and generate (225) a new graph with the revised process objects. The processor may repeat the clustering analysis (240, 245, 250) until the newly generated clusters are not very different from the clusters generated prior to addition of the new process objects.

If there are no new process objects (235) or if, for the new process objects, there are no significant differences between the newly generated clusters and the clusters generated prior to addition of the new process objects (245), the processor may compare (255) the process objects with the clusters (255) to determine whether the clusters match the process objects, as described above in FIG. 1. If each process object matches a cluster (260), the processor may proceed with the analysis.

If, however, a process object does not match any cluster (260), such may indicate an anomaly, in which the unmatched process object is a collection of components that better belong in other process objects. The processor may generate and display an error message to the user that there is an unmatched process object. The error message may indicate the unmatched process object, for example. The user may delete that unmatched process object and distribute its components among the other process objects that may be more appropriate to handle the components. The processor may receive (265) the revised process objects from the user and generate (225) a new graph with the revised process objects. The processor may repeat the clustering analysis (240, 245, 250) and the matching analysis (255, 260, 265) until each process object matches a cluster (260).

If each process object matches a cluster (260), the processor may determine whether each cluster matches a process object (270). If so, the processor may deem (280) all the process objects as acceptable. The accepted process objects may then be processed further or accepted for use in applications.

If, however, a cluster does not match any process object (270), such may indicate an anomaly, in which the components represented by the nodes in the unmatched cluster better belong in a single process object, either as a new process object or as additions to an existing process object. The processor may generate and display an error message to the user that there is an unmatched cluster. The error message may indicate the process objects and/or components represented by the nodes in the unmatched cluster, for example. The user may create a new process object made up of the components or revise an existing process object to add the components. The processor may receive (275) the revised process objects from the user and generate (225) a new graph with the revised process objects. The processor may repeat the clustering analysis (240, 245, 250), the object matching analysis (255, 260, 265), and the cluster matching analysis (270, 275) until each cluster matches a process object (270).

Figure 3:
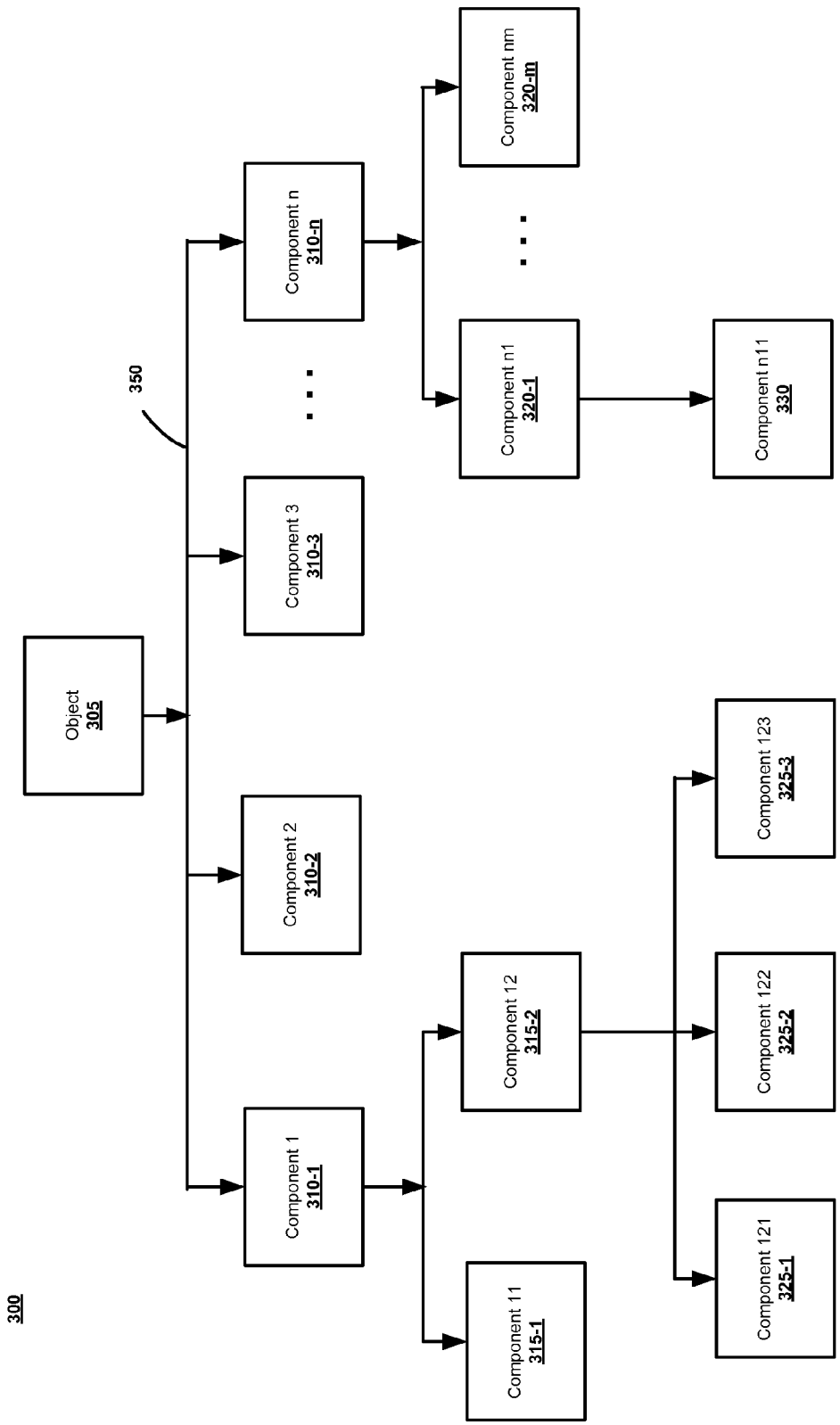
FIG. 3 is a block diagram that depicts the structure of a process object in accordance with an embodiment of the present invention.

FIG. 3 is a block diagram that depicts an example of the structure of a process object in accordance with an embodiment of the present invention. In this depiction, a process object 305 may include components 1 through n and their various subcomponents. A component may include data, routines, and/or other process objects. The lines 350 connecting the various components depict the relationships (or associations), defined in the structures, between the components. For example, the process object 305 may be made up of n process objects 310-1 . . . 310-n, which is indicated by the lines 350 connecting the objects. The process object 310-1 may refer to two other process objects 315-1 and 315-2. And so on. In an embodiment of the present invention, each process object in a repository may be depicted in this manner. Additional lines 350 may be depicted connecting components of one process object with associated components of other process objects.

Figure 4:
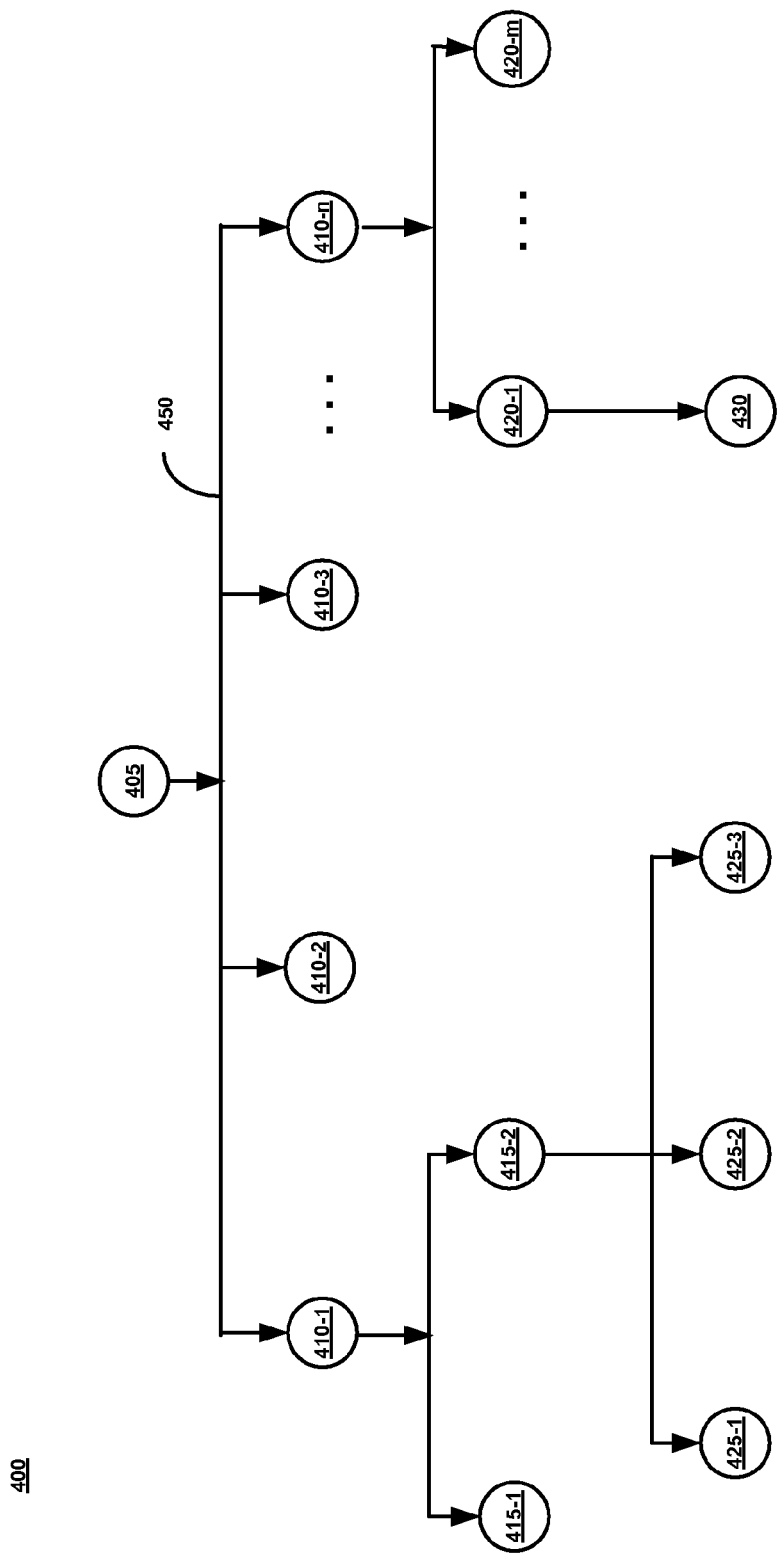
FIG. 4 depicts a graphical representation of the process object of FIG. 3 in accordance with an embodiment of the present invention.

FIG. 4 depicts a graphical representation of the process object of FIG. 3 in accordance with an embodiment of the present invention. Here, the process object structure of FIG. 3 may be mapped into the directed graph shown in FIG. 4. The circle 405 indicates a root node of the graph and represents the process object 305. The remaining circles 410 . . . 430 indicate child nodes of the graph and represent the respective components 310 . . . 330 of the process object 305. The edges 450 connecting the various nodes depict the relationships (or associations) between the nodes. In an embodiment of the present invention, each process object in a repository may be mapped into a directed graph in this manner. Additional edges 450 may be depicted connecting nodes of one process object with associated nodes of other process objects.

Figure 5:
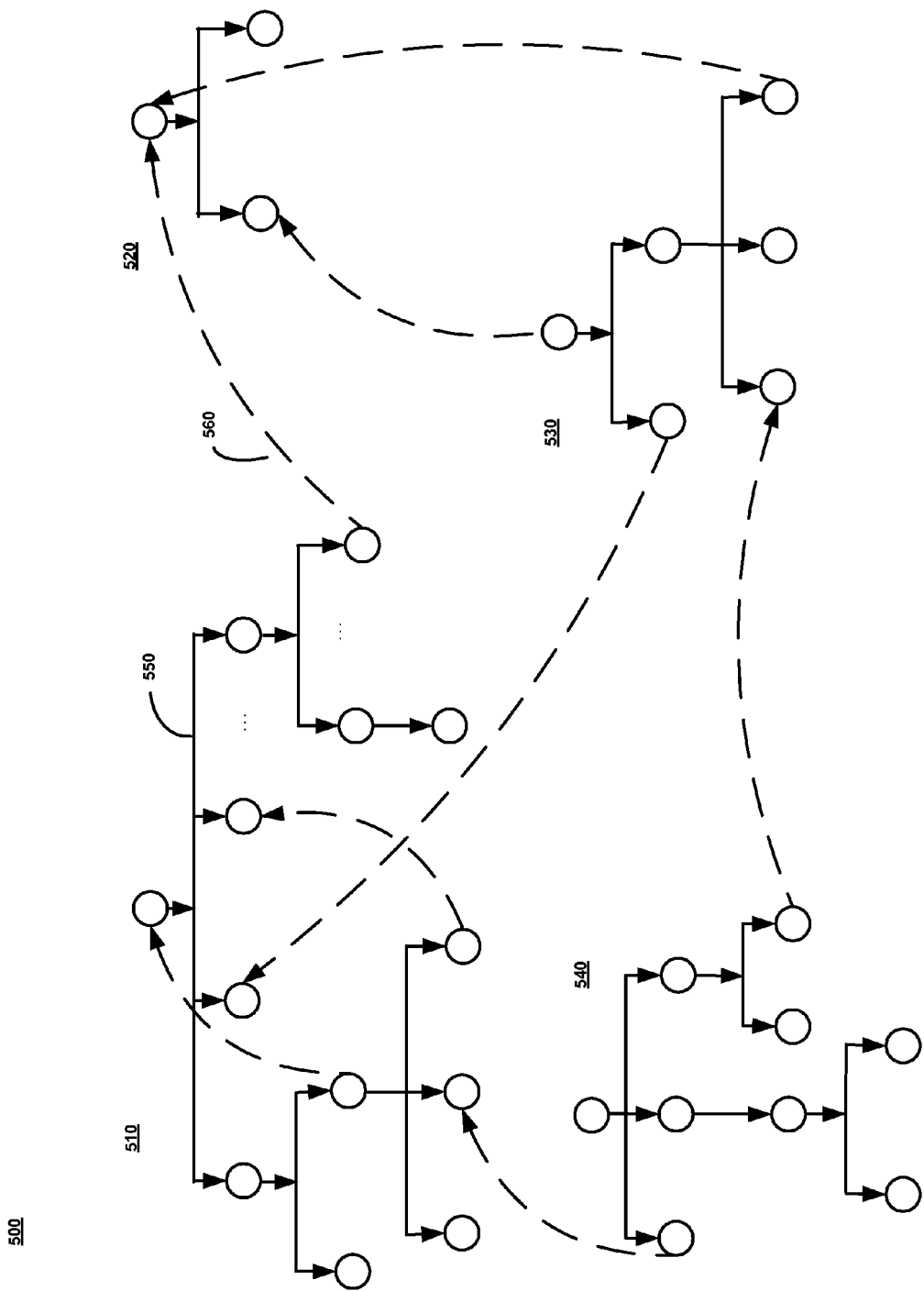
FIG. 5 depicts a graphical representation of a set of process objects in accordance with an embodiment of the present invention.

FIG. 5 depicts a graphical representation of a set of process objects in accordance with an embodiment of the present invention. Here, four process objects in a repository may be mapped into respective sub-graphs 510, 5/20, 530, and 540. Edges 550 connecting nodes within the same sub-graph represent relationships (or associations) between components in that process object. Edges 560 connecting nodes in different sub-graphs represent relationships (or associations) between components in different process objects. These sub-graphs together may form a directed graph 500, which may be graphically analyzed according to an embodiment of the present invention. The results of which would indicate whether the process objects represented by the sub-graphs are acceptable for further review or accepted for use in applications.

Figure 6:
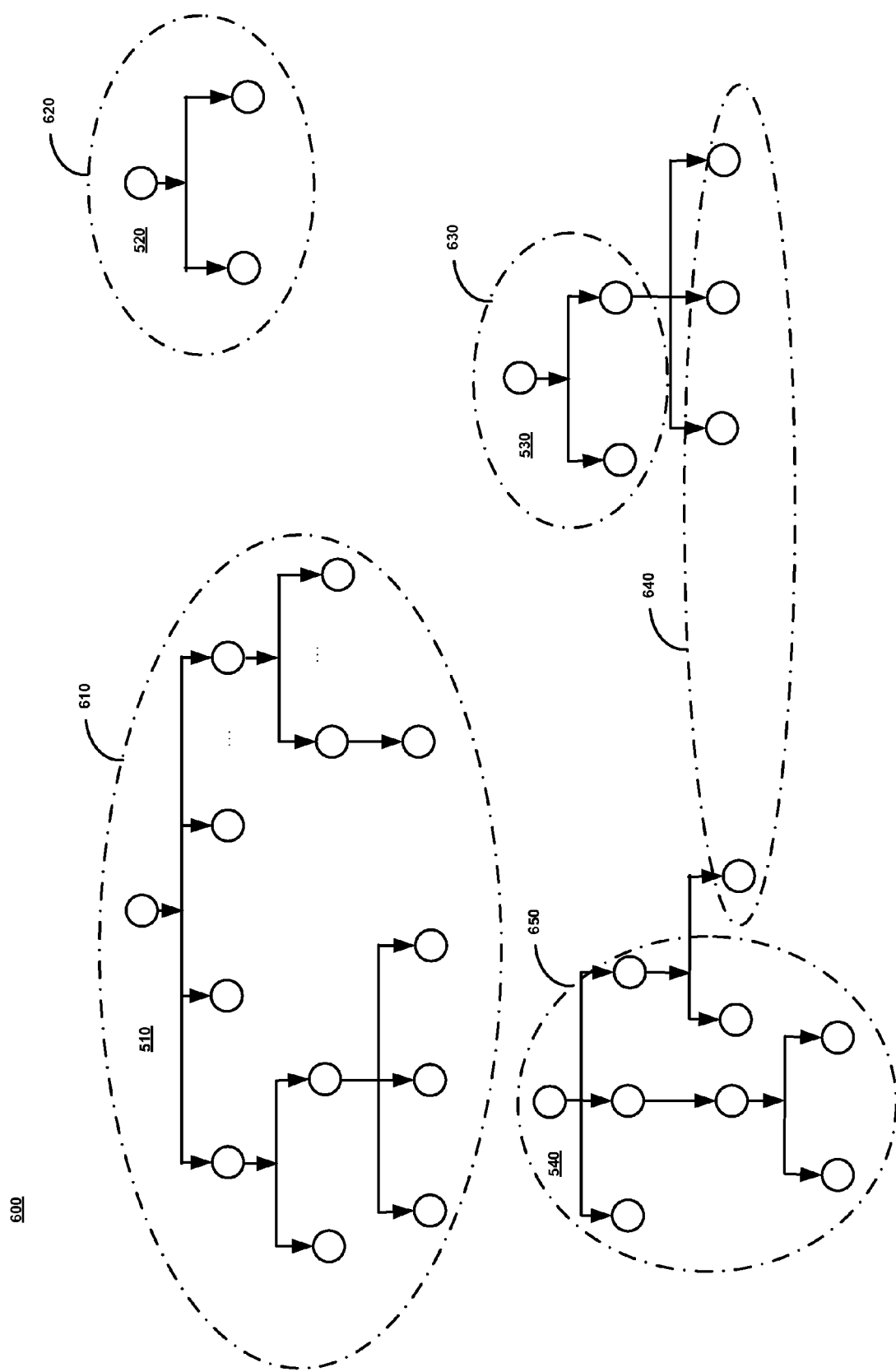
FIG. 6 depicts a graphical representation of clusters generated for the set of process objects in FIG. 5 in accordance with an embodiment of the present invention.

FIG. 6 depicts a graphical representation of clusters generated from the set of process objects in FIG. 5 in accordance with an embodiment of the present invention. Here, a clustering algorithm may cluster the nodes of the four sub-graphs 510, 520, 530, and 540, which represent respective process objects, according to some clustering parameters. In this example, the clustering algorithm has clustered the graph 500 into five clusters 610, 620, 630, 640, and 650. In an embodiment of the present invention, the four process objects may be compared to the five clusters to determine whether the process objects correspond to any of the clusters. Here, sub-graphs 510 and 520 have been wholly clustered into respective clusters 610 and 620. Accordingly, the process objects for these sub-graphs 510 and 520 should be determined to match these clusters.

On the other hand, sub-graphs 530 and 540 have been split between three clusters 630, 640/, and 650. Cluster 630 includes some of the nodes of sub-graph 530. Cluster 650 includes most of the nodes of sub-graph 540. Cluster 640 includes the remaining nodes from sub-graphs 530 and 540. Here, the process objects for these sub-graphs 530 and 540 will likely not match any of the clusters, but will be most closely related to respective clusters 630 and 650. Accordingly, the components represented by the nodes in these clusters should be re-distributed into new process objects and/or existing process objects. For example, the process object for the sub-graph 540 may be revised to delete the component represented by the node in cluster 640. Similarly, the process object for the sub-graph 530 may be revised to re-distribute the components represented by the top three nodes in cluster 630 to other sub-graphs. Since the top node has a relationship (or association) with a node of sub-graph 520 (as shown in FIG. 5), the component represented by the top node and, optionally, the components represented by one or both of the other two nodes may be added to the process object for sub-graph 520. Similarly, since another of the nodes has a relationship (or association) with a node of sub-graph 510 (as shown in FIG. 5), the component represented by that node may be added to the process object for sub-graph 510. Alternatively, a new process object may be formed of components represented by the nodes in cluster 630.

Here, cluster 640 is unlikely to match any process object because it is made up of lower child nodes, which represent lower components of respective process objects. Accordingly, the components represented by the lower four nodes may be put into a new object or added to an existing object.

After any of the above revisions are deemed appropriate and implemented by the user, a new graph may be generated and the clustering re-done until process objects match clusters.

Figure 7:
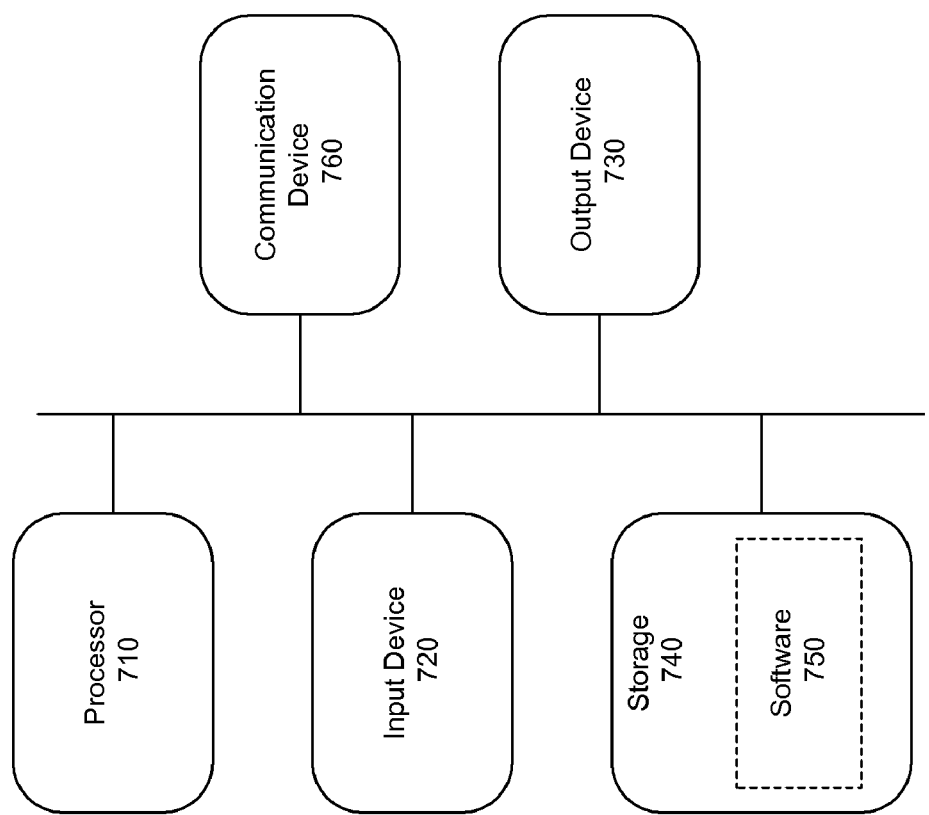
FIG. 7 is a block diagram that depicts a computing device for implementing a method in accordance with an embodiment of the present invention.

FIG. 7 illustrates the components of a basic computing device in accordance with an embodiment of the present invention. The computing device may be a personal computer, workstation, handheld personal digital assistant ("PDA"), or any other type of microprocessor-based device. The computing device may include one or more of processor 710, input device 720, output device 730, storage 740, and communication device 760.

Input device 720 may include a keyboard, mouse, pen-operated touch screen or monitor, voice-recognition device, or any other device that provides input. Output device 730 may include a monitor, printer, disk drive, speakers, or any other device that provides output.

Storage 740 may include volatile and nonvolatile data storage, including one or more electrical, magnetic or optical memories such as a RAM, cache, hard drive, CD-ROM drive, tape drive or removable storage disk. Communication device 760 may include a modem, network interface card, or any other device capable of transmitting and receiving signals over a network. The components of the computing device may be connected via an electrical bus or wirelessly.

Software 750, which may be stored in storage 740 and executed by processor 710, may include, for example, the application programming that embodies the functionality of the present invention.

The network connecting the computer components may include any type of interconnected communication system, which may implement any communications protocol, which may be secured by any security protocol. The corresponding network links may include telephone lines, DSL, cable networks, T1 or T3 lines, wireless network connections, or any other arrangement that implements the transmission and reception of network signals.

The computing device may implement any operating system, such as Windows or UNIX. Software 750 may be written in any programming language, such as ABAP, C, C++, Java or Visual Basic. In various embodiments, application software embodying the functionality of the present invention may be deployed on a standalone machine, in a client/server arrangement or through a Web browser as a Web-based application or Web service, for example.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A graphical analysis method to detect anomalies in objects, comprising:
    generating a graph to represent a group of objects, each object having components comprising data and routines to manipulate the data and having structures to define relationships between the components of the object and between the components of the object and the components of the other objects,
        wherein nodes of the graph represent the components of the objects, and
        wherein edges of the graph connect the nodes of the graph and represent the defined relationships between the components of the objects and the defined relationships between the components of two or more of the objects;
    forming clusters of the nodes of the graph;
    in a first test, for each object, comparing the object to the clusters to match the object with one of the clusters,
        if the object does not match one of the clusters, determining that the object includes at least one anomaly,
        otherwise, in a second test, calculating performance metrics for the clusters, and
            for each object,
                calculating performance metrics data for the object, and
                statistically comparing the metrics data for the object with metrics of the clusters; and
    based on the statistical comparison, determining whether the objects include at least one anomaly.

2. The method of claim 1, wherein the generating comprises:
    generating the nodes of the graph to represent the components of the objects,
    generating the edges of the graph to represent the defined relationships between the components of the objects and the defined relationships between the components of two or more of the objects, and
    connecting the nodes with the edges based on the defined relationships.

3. The method of claim 1, wherein the forming comprises:
    applying a clustering algorithm to the graph to form the clusters of nodes based on a plurality of clustering parameters.

4. The method of claim 1, wherein the matching comprises:
    designating the object as corresponding to the cluster if the difference between the metrics data for the cluster and the metrics data for the object is approximate to a predetermined value, within a predetermined range, or less than or greater than a predetermined limit.

5. The method of claim 1, wherein the determining comprises:
    designating the objects as including at least one anomaly if one or more of the objects does not correspond to any of the clusters,
    otherwise, designating the objects as free of anomalies.

6. The method of claim 1, wherein the determining comprises:
    for each cluster,
    designating the objects as including at least one anomaly if the cluster does not match any of the objects, wherein the anomaly is that the components represented by the nodes in the cluster should belong to a single object instead of belonging to multiple ones of the objects.

7. The method of claim 1, wherein the determining comprises:
    for each object newly added to the group of objects,
    designating the objects as including at least one anomaly if the clusters are very different from clusters generated prior to addition of the newly added object, wherein the anomaly is in either the newly added object or the other objects.

8. The method of claim 1, further comprising:
    if an object is new, adding the new object to the group of objects.

9. The method of claim 1, further comprising:
    upon detecting an anomaly, sending a message to a user regarding the detected anomaly;
    awaiting receipt of revised objects from the user that correct the detected anomaly; and
    upon receipt of the revised objects, repeating the generating, forming, comparing, and determining until no further anomalies are detected.

10. A system for graphically analyzing process objects to detect anomalies, comprising:
    a memory to store a set of process objects; and
    a processor in communication with the memory, the processor to:
        map the process objects into a graph, including to
            map components of the process objects into nodes of the graph, the components comprising data and routines to manipulate the data,
            map structures of the process objects into edges of the graph, the structures defining relationships between the components of the process objects and relationships between components of two or more of the process objects, and
            connect the nodes with the edges based on the defined relationships, cluster the nodes of the graph,
        in a first test, for each object, compare the object to the clusters to match the object with one of the clusters,
            if the object does not match one of the clusters, determine that the object includes at least one anomaly,
            otherwise, in a second test, calculate performance metrics for the clusters, and
                for each object,
                    calculate performance metrics data for the object, and
                    statistically compare the metrics data for the object with metrics of the clusters; and
        based on the statistical comparison, determine whether the objects include at least one anomaly.

11. The system of claim 10, wherein the processor is to:
detect at least one anomaly in a process object if a cluster does not correspond to any of the process objects and at least one of the nodes of the cluster represents at least one component of the process object.

12. The system of claim 10, wherein the processor is to:
detect at least one anomaly in a process object if the clusters are very different than previous clusters made prior to introduction of the process object into the set of process objects.

13. A computer-readable storage medium including instructions, that when executed by a processor, are adapted to execute a method to detect anomalies in process objects, the method comprising:
generate a graphical representation of a group of process objects, wherein each process object comprises data, routines that manipulate the data, and definitions of associations between the process object and the other process objects in the group,
wherein nodes in the graphical representation correspond to the data and the routines of the process objects, and
wherein edges in the graphical representation correspond to the associations between the process objects and connect the nodes together based on the associations;
cluster the nodes in the graphical representation; and
in a first test, for each object, compare the object to the clusters to match the object with one of the clusters,
if the object does not match one of the clusters, determine that the object includes at least one anomaly,
otherwise, in a second test, calculate performance metrics for the clusters, and
for each object,
calculate performance metrics data for the object, and
statistically compare the metrics data for the object with metrics of the clusters; and
based on the statistical comparison, determine whether the objects include at least one anomaly.

14. The computer-readable storage medium of claim 13, further comprising:
introduce new process objects into the group of process objects to create a new group of process objects, and
generate the graphical representation of the new group of process objects.

15. The computer-readable storage medium of claim 13, further comprising:
replace anomalous process objects with revised process objects that have the detected anomaly removed in the group of process object to create a revised group of process objects, and
generate the graphical representation of the revised group of process objects.

16. The computer-readable storage medium of claim 13, wherein the statistical comparison comprises:
computing the performance metrics for the clusters and the process objects,
comparing the computed metrics for the clusters to the computed metrics for the process objects, and
detecting if the difference between the computed metrics are outside a predetermined limit.

17. The computer-readable storage medium of claim 13, further comprising:
determine that the anomaly is a design anomaly in the process objects requiring correction.

18. The computer-readable storage medium of claim 13, further comprising:
apply a clustering algorithm to the graphical representation to cluster the nodes that are deemed to be alike based a set of clustering parameters.

19. The method of claim 1, wherein the performance metrics associate a relationship parameter between the object and the clusters.

20. The system of claim 10, wherein the performance metrics associate a relationship parameter between the object and the clusters.

21. The computer-readable storage medium of claim 13, wherein the performance metrics associate a relationship parameter between the object and the clusters.

* * * * *